(12) United States Patent
Tsuruta et al.

(10) Patent No.: US 11,217,816 B2
(45) Date of Patent: Jan. 4, 2022

(54) POWER STORAGE DEVICE

(71) Applicant: TOYOTA JIDOSHA KABUSHIKI KAISHA, Toyota (JP)

(72) Inventors: Haruka Tsuruta, Toyota (JP); Takashi Murata, Kasugai (JP); Satoshi Kitagawa, Uji (JP); Masaki Hanada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 16/853,015

(22) Filed: Apr. 20, 2020

(65) Prior Publication Data

US 2020/0343576 A1    Oct. 29, 2020

(30) Foreign Application Priority Data

Apr. 23, 2019   (JP) .............................. JP2019-081598

(51) Int. Cl.
| | |
|---|---|
| *H01M 10/04* | (2006.01) |
| *H01G 9/08* | (2006.01) |
| *H01G 9/00* | (2006.01) |
| *H01M 10/6556* | (2014.01) |
| *H01M 10/625* | (2014.01) |
| *H01M 10/6568* | (2014.01) |

(52) U.S. Cl.
CPC ...... *H01M 10/0481* (2013.01); *H01G 9/0003* (2013.01); *H01G 9/08* (2013.01); *H01M 10/625* (2015.04); *H01M 10/6556* (2015.04); *H01M 10/6568* (2015.04); *H01M 2220/20* (2013.01)

(58) Field of Classification Search
CPC ........ H01G 11/10; H01G 11/14; H01G 11/18; H01G 11/82; H01G 2/08; H01G 2/106; H01G 9/0003; H01G 9/08; H01M 10/0481; H01M 10/613; H01M 10/615; H01M 10/625; H01M 10/6556; H01M 10/6568; H01M 2220/20; H01M 50/20; Y02E 60/10; Y02P 70/50; Y02T 10/70
See application file for complete search history.

(56) References Cited

U.S. PATENT DOCUMENTS

| | | | |
|---|---|---|---|
| 2008/0096072 A1* | 4/2008 | Fukusako | ......... H01M 10/6571 429/96 |
| 2018/0006345 A1 | 1/2018 | Murata et al. | |
| 2021/0234212 A1* | 7/2021 | Gaigg | ................. H01M 10/613 |

FOREIGN PATENT DOCUMENTS

| | | |
|---|---|---|
| JP | 2015-111493 A | 6/2015 |
| JP | 2018-006117 A | 1/2018 |

* cited by examiner

*Primary Examiner* — Victoria H Lynch
(74) *Attorney, Agent, or Firm* — Sughrue Mion, PLLC (57) ABSTRACT

A power storage device includes: a power storage stack which includes a plurality of power storage cells; a heating member that heats the power storage stack; a cooling member that cools the power storage stack; a first pressing member that presses the heating member against the power storage stack; a second pressing member that presses the cooling member against the power storage stack; and a sheet member covering the bottom of the power storage stack so that an enclosed space is formed between the sheet member and the power storage stack in a cross section of the power storage stack, wherein the sheet member has a first surface and a second surface, the cooling member is disposed on the first surface, within the enclosed space, and the heating member is disposed on the second surface, on an outer side of the enclosed space.

7 Claims, 4 Drawing Sheets

POWER STORAGE DEVICE

This nonprovisional application is based on Japanese Patent Application No. 2019-081598 filed on Apr. 23, 2019 with the Japan Patent Office, the entire content of which is hereby incorporated by reference.

BACKGROUND

Field

The present disclosure relates to a power storage device, and, more particularly, to a power storage device to be mounted on a vehicle.

Description of the Background Art

Conventionally, various power storage devices are proposed which include a heater for heating a power storage module in order to ensure power characteristics of the power storage device even in low temperature environment, such as cold climate areas.

Japanese Patent Laying-Open No. 2018-006117 discloses a power storage device which includes a heater, in an enclosed space, for heating multiple power storage cells, the enclosed space being formed between the bottom of a housing case accommodating the power storage cells and the bottoms of the power storage cells. The heater is disposed below the power storage cells, spaced apart from the power storage cells.

SUMMARY

In power storage devices, power storage cells are repeatedly charged and discharged, in accordance with a traveling state of the vehicle. Accordingly, the temperatures of the power storage cells increase. For this reason, one may contemplate to bring a cooling member, which circulates a refrigerant, into abutment with the power storage cells to cool them.

However, if the cooling member is arranged without careful consideration, condensation may occur around the cooling member, and condensation adheres to the surfaces of the power storage cells and short-circuiting of the power storage cells may result.

The present disclosure is made in view of the above problem, and an object of the present disclosure is to provide a power storage device which inhibits short-circuiting of a power storage stack caused by condensation, and regulates the temperatures of the power storage modules while suppressing the temperature variations.

A power storage device according to the present disclosure includes: a power storage stack which includes a plurality of power storage cells aligned in a given alignment direction; a heating member that is deformable to follow steps between the plurality of power storage cells and heats the power storage stack; a cooling member that is deformable to follow the steps between the plurality of power storage cells and has a refrigerant flow passage through which a refrigerant for cooling the power storage stack flows; a first pressing member that presses the heating member against the power storage stack; a second pressing member that presses the cooling member against the power storage stack; and a sheet member covering a bottom of the power storage stack so that an enclosed space is formed between the sheet member and the power storage stack in a cross section of the power storage stack perpendicular to the alignment direction. The sheet member has a first surface and a second surface which are in opposing relation, the first surface facing the power storage stack, the second surface facing opposite the power storage stack. The cooling member is disposed on a first surface side, within the enclosed space. The heating member is disposed on a second surface side, on an outer side of the enclosed space.

According to the above configuration, the heating member, deformable to follow the steps between the plurality of power storage cells, is pressed by the first pressing member against the power storage stack, thereby suppressing variations in temperature between the plurality of power storage cells when heating the power storage stack.

Moreover, the cooling member, deformable to follow the steps between the plurality of power storage cells, is pressed by the second pressing member against the power storage stack, thereby suppressing variations in temperature between the plurality of power storage cells when cooling the power storage stack.

Furthermore, the space in which the cooling member is disposed and the space in which the heating member is disposed can be partitioned by the sheet member covering the bottom of the first power storage stack. This can inhibit the air, in the space in which the heating member is disposed, from advancing to the enclosed space in which the cooling member is disposed. As a result, condensation on the surface of the cooling member can be inhibited from occurring, thereby inhibiting the first power storage stack from short-circuiting due to the condensation.

As such, the power storage device can inhibit short-circuiting of the power storage cells caused by condensation, and regulates the temperatures of the power storage stack while suppressing the temperature variations.

According to the power storage device of the present disclosure, the sheet member may be sandwiched between the power storage stack and the heating member by a pressing force by the first pressing member.

According to the above configuration, the sheet member can be held between the heating member and the power storage stack by making use of the pressing force by the first pressing member pressing the heating member against the power storage stack. For this reason, there is no need for a separate holding member for holding the sheet member, achieving reduction in part count and reduction in manufacturing cost.

According to the power storage device of the present disclosure, the plurality of power storage cells each may include a case having a bottom surface and accommodating a power storage element, and a frame covering the bottom surface of the case. In this case, preferably, the frame has a notch through which a portion of the bottom surface of the case facing the cooling member is exposed, and, preferably, the cooling member is pressed against the bottom surface of the case exposed through the notch.

According to the above configuration, heat can be absorbed efficiently by the cooling member from the case accommodating the power storage element, thereby enhancing the efficiency in cooling the power storage cell.

According to the power storage device of the present disclosure, preferably, a thermal conductive sheet is disposed between the cooling member and the bottom surface of the case exposed through the notch, the thermal conductive sheet being electrically insulative.

According to the above configuration, if the cooling member is electrical conductive, the direct contact of the cooling member and the case of the power storage cell can be prevented, thereby preventing short-circuiting of the power storage cells.

According to the power storage device of the present disclosure, an elastic modulus of the first pressing member pressing the heating member may be lower than an elastic modulus of the second pressing member pressing the cooling member.

According to the above configuration, the second pressing member can have a restoring force greater than the restoring force of the first pressing member. This allows the second pressing member to have a pressing force greater than the pressing force of the first pressing member, thereby allowing the cooling member to be more strongly pressed against the power storage stack. As a result, an enhanced efficiency in cooling the power storage stack is achieved.

According to the power storage device of the present disclosure, preferably, the power storage stack includes a first end portion and a second end portion in a direction perpendicular to the alignment direction. In this case, preferably, the first pressing member includes a first press disposed on a first end portion side and a second press disposed on a second end portion side, and, preferably, the second pressing member is disposed between the first press and the second press in the direction perpendicular to the alignment direction. Preferably, the power storage device further includes: a first mount portion on which the first press is mounted, a second mount portion on which the second press is mounted, and a third mount portion on which the second pressing member is mounted. In this case, preferably, the first mount portion and the second mount portion are located closer to the power storage stack than the third mount portion is, and, preferably, a pressing force by the second pressing member is greater than pressing forces by the first press and the second press.

According to the above configuration, the sheet member can be sandwiched between the first power storage stack and the heating member by the pressing forces of the first press and the second press disposed on the both sides of the second pressing member in the direction perpendicular to the alignment direction. In addition, the second pressing member having a greater pressing force than the pressing forces of the first press and the second press allows the cooling member to be strongly pressed against the first power storage stack. As a result, the airtightness of the enclosed space formed by the sheet member is enhanced, and the efficiency in cooling the first power storage stack by the cooling member is also enhanced.

Furthermore, the first mount portion and the second mount portion, having the first press and the second press mounted thereon, are located closer to the first power storage stack than the third mount portion having the second pressing member mounted thereon is, and thus the first press and the second press can be reduced in thickness. As a result, reduction in cost of the first press and the second press is achieved.

Preferably, the power storage device according to the present disclosure further includes a housing accommodating the power storage stack. In this case, a gap is provided between the first mount portion and the housing, and a gap is provided between the second mount portion and the housing.

According to the above configuration, the gaps function as thermal-insulation layers. This causes the heat, transferred from the heating member to the first mount portion and the second mount portion, to be less likely to be transferred to the housing. For this reason, the efficiency in heating the power storage stack is enhanced.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment according to the present disclosure will be described, with reference to the accompanying drawings. Note that the embodiment below uses the same reference signs to refer to the same or common parts, and description thereof will not be repeated.

Figure 1:
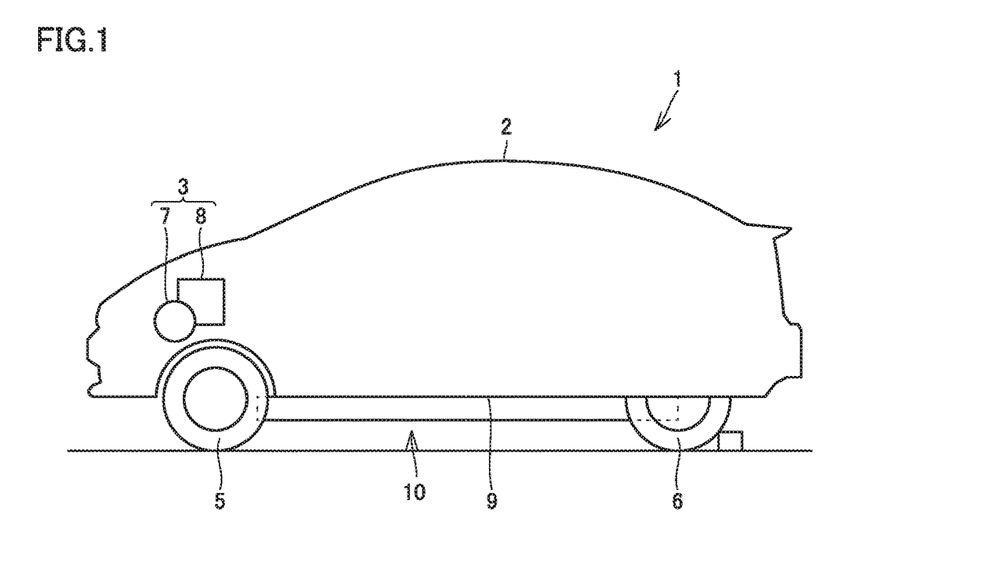
FIG. 1 is a schematic diagram of a vehicle which includes a power storage device according to an embodiment.

FIG. 1 is a schematic diagram of a vehicle which includes a power storage device according to the embodiment. Referring to FIG. 1, a vehicle 1 which includes a power storage device 10 according to the embodiment will be described.

Vehicle 1 includes a vehicle body 2, a driving gear 3, front wheels 5, rear wheels 6, and power storage device 10. An engine compartment, a boarding space, and a luggage room are formed within vehicle body 2. The engine compartment is formed on the front side of vehicle 1. The boarding space is formed on the rear side of the engine compartment. The luggage room is formed behind the boarding space.

Driving gear 3 is accommodated within the engine compartment. Driving gear 3 includes a rotating electric machine 7 and a power control unit (PCU) 8. PCU 8 includes an inverter and a converter. PCU 8 is electrically connected to power storage device 10 and rotating electric machine 7.

PCU 8 boosts the voltage of a direct-current (DC) power supplied from power storage device 10, further converts the DC power into an alternating-current (AC) power and supplies the AC power to rotating electric machine 7.

Using the AC power supplied from PCU 8, rotating electric machine 7 generates a driving force for rotating front wheels 5. Note that vehicle 1 is an electric-powered vehicle, such as electric vehicles and hybrid vehicles.

Figure 2:
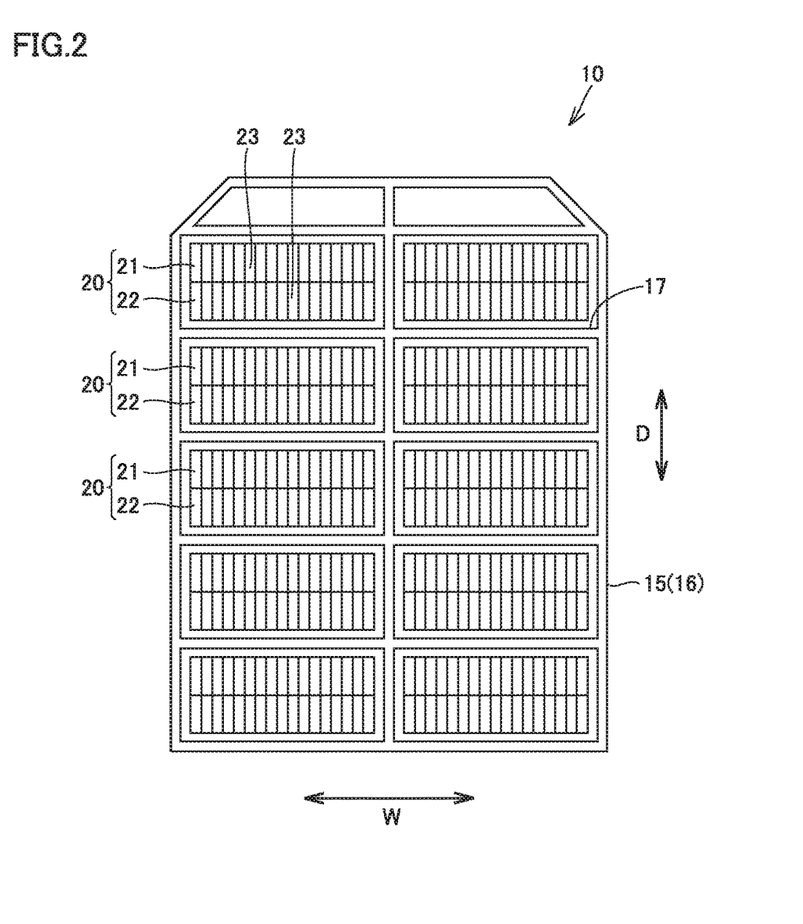
FIG. 2 is a diagram showing arrangement of power storage modules within a housing in the power storage device according to the embodiment.

FIG. 2 is a diagram showing arrangement of power storage modules within the housing in the power storage device according to the embodiment.

As shown in FIG. 2, power storage device 10 includes multiple power storage modules 20 and a housing 15 accommodating power storage modules 20. Housing 15 includes a lower housing 16 and an upper housing. However, for conveniences, the upper housing is omitted in FIG. 2. In other words, FIG. 2 shows a schematic top plan view of power storage device 10, without the upper housing.

In housing 15, lower housing 16 has a generally box shape having an opening that opens upward. Lower housing 16 is formed from aluminum or aluminum alloy, for example.

The upper housing (not shown) is disposed, blocking the opening of lower housing 16. The upper housing is formed from, for example, a resin or the like for weight reduction. Note that the upper housing may be formed of a metal member.

Reinforcing members 17, each formed in a grating shape, are disposed within lower housing 16. Power storage modules 20 are arranged in the sections divided by reinforcing members 17. Note that reinforcing members 17 may be omitted.

Power storage modules 20 are arranged in rows and columns. Power storage modules 20 are arranged, for example, in two rows in a direction parallel to the width direction (W direction) of vehicle 1 and five columns in a direction parallel to the front-rear direction (D direction) of vehicle 1.

Power storage modules 20 each include a first power storage stack 21 and a second power storage stack 22. First power storage stack 21 and second power storage stack 22 are arranged adjacent to each other in the direction parallel to the front-rear direction D of vehicle 1. First power storage stack 21 and second power storage stack 22 are electrically connected in series.

While the figure shows power storage module 20 as including two power storage stacks: first power storage stack 21; and second power storage stack 22, the present disclosure is not limited thereto. Power storage module 20 may include one power storage stack or three or more power storage stacks.

First power storage stack 21 and second power storage stack 22 each have multiple power storage cells 23 aligned in a given direction. For example, the given direction refers to the direction parallel to width direction W of vehicle 1 with power storage device 10 mounted on vehicle 1.

Power storage cells 23 each have, for example, a rectangular shape. For example, a single cell can be employed as power storage cell 23. Examples of the single cell include a secondary battery such as a nickel-hydrogen battery or a lithium-ion battery. The single cell has, for example, a rectangular shape. The secondary battery may be one using liquid electrolyte or one using a solid electrolyte. Note that power storage cell 23 may be a chargeable/dischargeable unit capacitor.

Figure 3:
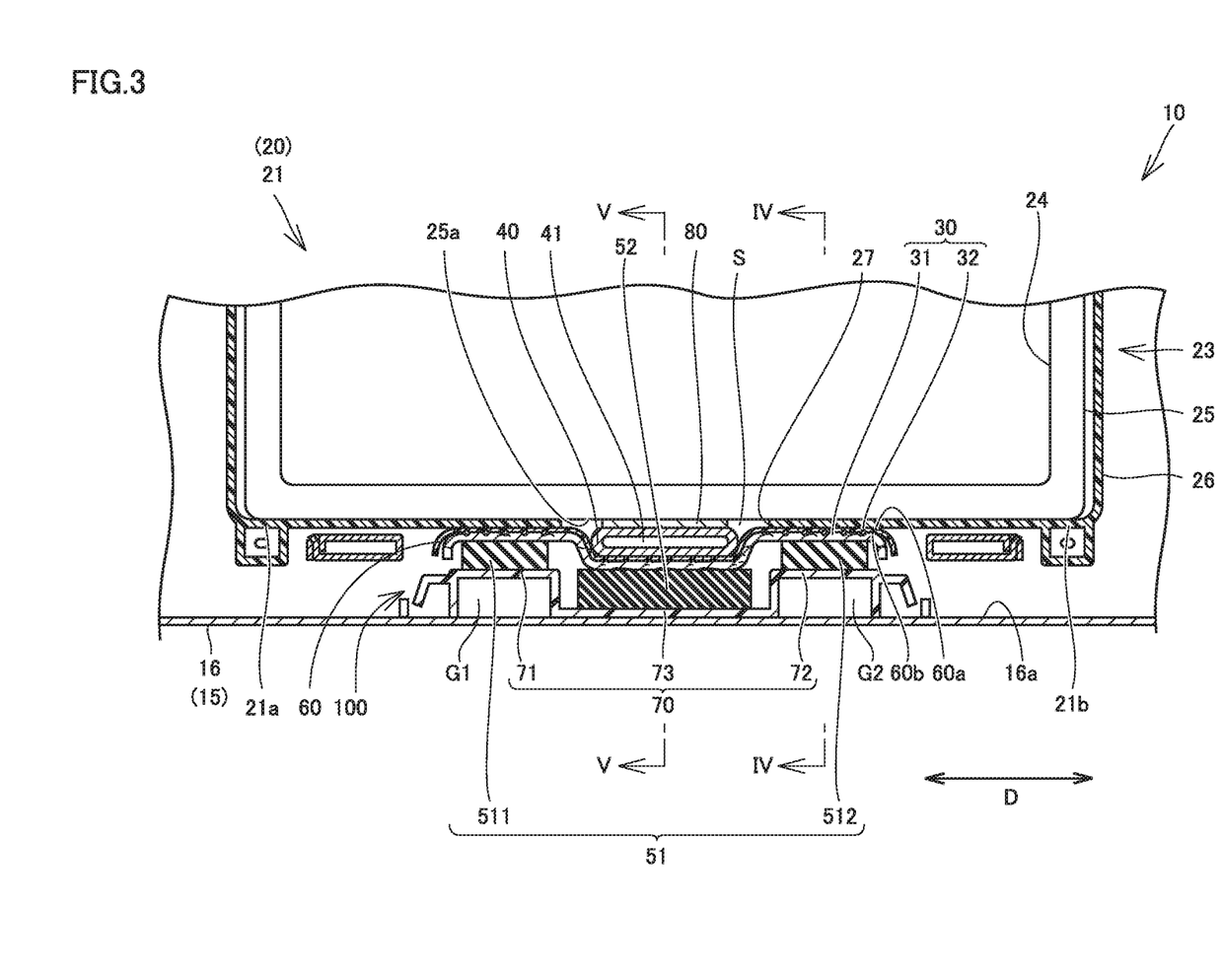
FIG. 3 is a cross-sectional view of the power storage module and its surrounding components in the power storage device according to the embodiment.
Figure 4:
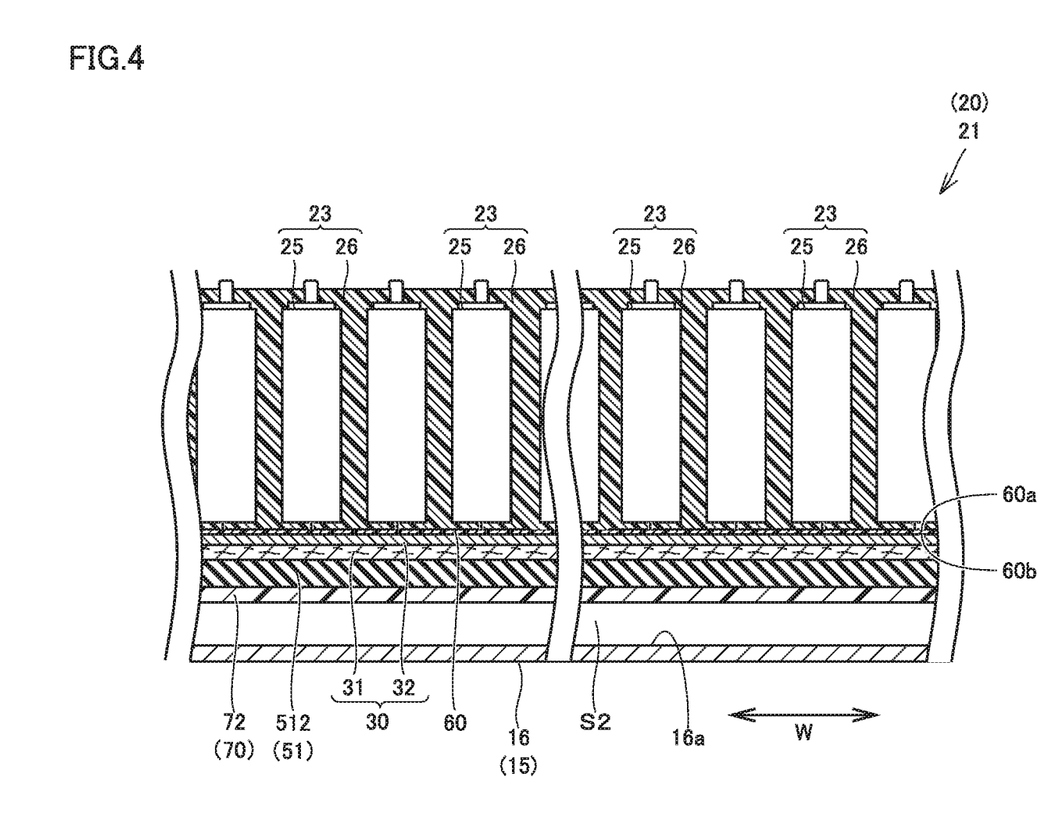
FIG. 4 is a cross-sectional view of the power storage device, taken along line IV-IV shown in FIG. 3.
Figure 5:
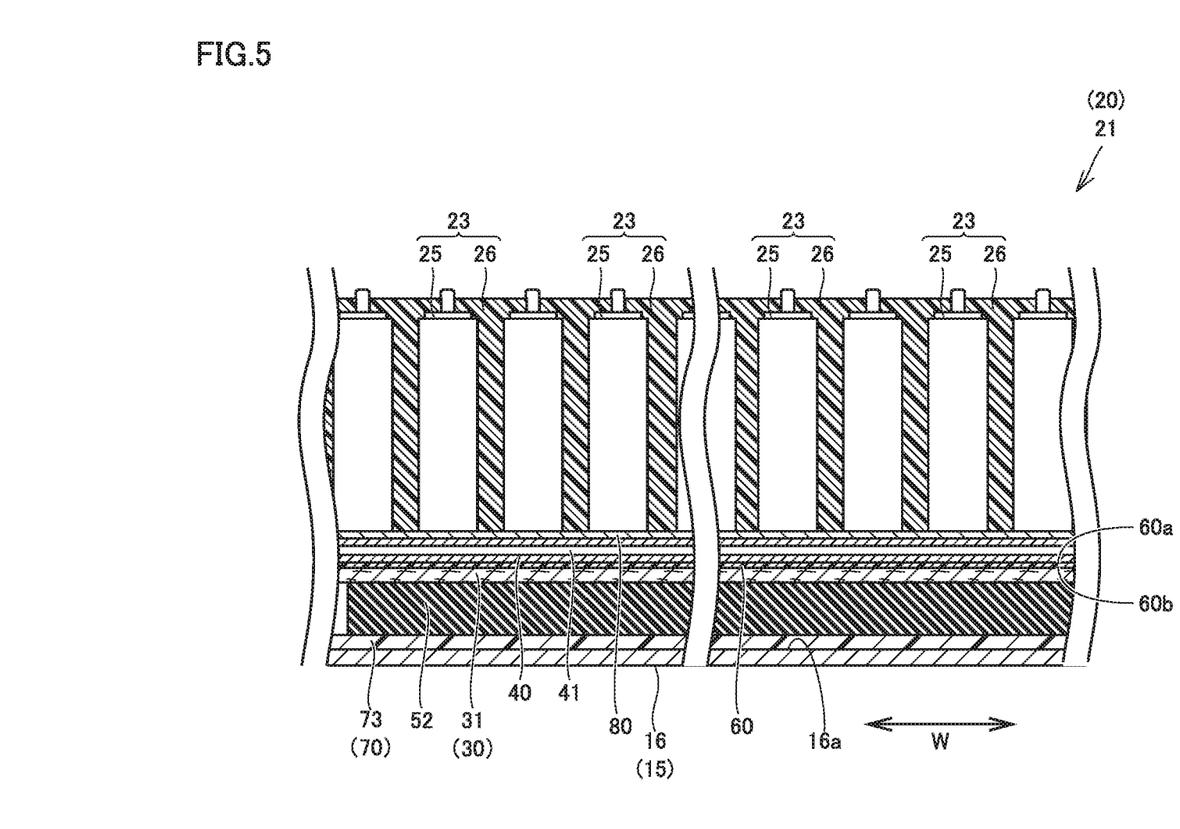
FIG. 5 is a cross-sectional view of the power storage device, taken along line V-V shown in FIG. 3.

FIG. 3 is a cross-sectional view of the power storage module and its surrounding components in the power storage device according to the embodiment. FIG. 4 is a cross-sectional view of the power storage device, taken along line IV-IV shown in FIG. 3. FIG. 5 is a cross-sectional view of the power storage device, taken along line V-V shown in FIG. 3. Referring to FIGS. 3 to 5, the surrounding components of power storage module 20 will be described.

While FIG. 3 shows a configuration of first power storage stack 21 of power storage module 20, it should be noted that second power storage stack 22 has the same configuration as first power storage stack 21. For this reason, description of the configuration of second power storage stack 22 will be omitted.

As shown in FIGS. 3 to 5, power storage device 10 includes multiple temperature regulating mechanisms 100 for regulating the temperatures of power storage modules 20. Temperature regulating mechanism 100 is provided for each power storage stack. Temperature regulating mechanism 100 is arranged between the bottom of the power storage stack and a bottom 16a of lower housing 16.

Temperature regulating mechanism 100 includes a heating member 30, a cooling member 40, a first pressing member 51, a second pressing member 52, a sheet member 60, a base member 70, and a thermally conductive sheet 80.

Each of power storage cells 23 further includes a cell element 24, a case 25, and a frame 26. Cell element 24 has, for example, a positive electrode core, a negative electrode core, and a separator (none of which are shown). The positive electrode core and the negative electrode core are wound via the separator.

Case 25 has a rectangular shape having a bottom surface 25a, and accommodates cell element 24 therein. A portion of frame 26 covers bottom surface 25a of case 25. Case 25 is formed from, for example, a metallic material.

Frame 26 is a resin spacer disposed on one side of case 25 in the direction of alignment of power storage cells 23. Frame 26 is disposed between adjacent power storage cells 23 in the state in which the power storage cells 23 are aligned.

Frame 26 has a notch 27 through which a portion of bottom surface 25a of case 25 facing cooling member 40 is exposed.

Power storage cells 23 are put between a pair of end plates (not shown) disposed on both ends in the direction of alignment of power storage cells 23. The pair of end plates are coupled together by a restraining band (not shown). The restraining band secures the power storage cells 23 and the pair of end plates with a compression load applied thereto in the direction of alignment of power storage cells 23. Due to the application of the compression load in the direction of alignment, power storage cells 23 may vary in height. In this case, a step is formed between power storage cell 23 that is heightwise offset and the adjacent power storage cell 23.

Sheet member 60 covers the bottom of first power storage stack 21 in a manner that an enclosed space S is formed between sheet member 60 and first power storage stack 21 in a cross section of first power storage stack 21 perpendicular to the direction of alignment of power storage cells 23. Enclosed space S is formed directly below the center portion of first power storage stack 21 in the direction (D direction) perpendicular to the direction of alignment of power storage cells 23.

Sheet member 60 is configured of, for example, a resin film. Preferably, the resin film has low permeability. More preferably, the resin film is impermeable.

The both sides of the center of sheet member 60 in D direction are in abutment with the bottom of first power storage stack 21. Specifically, the both sides of the center of sheet member 60 are in abutment with frame 26 at portions around notch 27.

Sheet member 60 has a first surface 60a and a second surface 60b which are in opposing relation, the first surface 60a facing first power storage stack 21, the second surface 60b facing opposite the first power storage stack 21.

Sheet member 60 is disposed between first power storage stack 21 and heating member 30. Sheet member 60 is pressed by first pressing member 51 from the second surface 60b side, thereby being sandwiched between first power storage stack 21 and heating member 30.

Specifically, the both sides of the center of sheet member 60 are pressed by a first press 511 and a second press 512 described below, thereby being sandwiched between first power storage stack 21 and heating member 30.

As such, sheet member 60 is held by making use of the pressing force by first pressing member 51, thereby obviating the need for a separate holding member for holding the sheet member 60. This achieves reduction in part count and reduction in manufacturing cost.

The center portion of sheet member 60 in D direction is located between cooling member 40 and heating member 30 (base material 31). The center portion of sheet member 60 is pressed by second pressing member 52 from the second surface 60b side, thereby being sandwiched between cooling member 40 and heating member 30. This can also hold sheet member 60 rigidly.

Heating member 30 is capable of heating the first power storage stack 21. Heating member 30 extends along the direction of alignment of power storage cells 23. Heating member 30 is disposed on second surface 60b of sheet member 60, on outer sides of enclosed space S. Specifically, heating member 30 is disposed directly below the sheet member 60. Heating member 30 is deformable to follow the steps between power storage cells 21.

Heating member 30 includes a sheet of base material 31, and a heater wire 32. For example, a nonwoven fabric can be employed as base material 31. Heater wire 32 encounters the primary surface of base material 31 facing the power storage module 20.

Heater wire 32 is disposed on both sides of the center of base material 31 in D direction. Heater wire 32 is disposed, not overlapping with cooling member 40 in the vertical direction. As such, heater wire 32 is arranged, spaced apart from cooling member 40, thereby suppressing transfer of heat from heater wire 32 to cooling member 40.

Heater wire 32 includes multiple wires and an insulation coating, coating the wires. Heater wire 32 has a cross-sectional diameter of, for example, about 1 mm. Heater wire 32 is formed to be deformable to a shape of the bottom surface of first power storage stack 21. In other words, heater wire 32 is deformable to follow the steps between power storage cells 21.

While heater wire 32 linearly extends in FIG. 4 for conveniences, it should be noted that heater wire 32 is not limited to be linear, and may be serpentine. An appropriate pattern can be set.

As a current flows through heater wire 32, the temperature of heater wire 32 increases. Heat generated by heater wire 32 passes through frame 26 to the bottom surface of power storage module 20, thereby increasing the temperature of power storage module 20.

Cooling member 40 is capable of cooling first power storage stack 21. Cooling member 40 extends along the direction of alignment of power storage cells 23. Cooling member 40 is disposed on first surface 60a of sheet member 60, within enclosed space S.

Cooling member 40 is disposed between first power storage stack 21 and sheet member 60. Cooling member 40 is disposed within notch 27, as viewed in the vertical direction. Thermally conductive sheet 80 is disposed between bottom surface 25a of case 25 and cooling member 40. Thermally conductive sheet 80 is electrically insulative. This can prevent the direct contact of case 25 of power storage cell 23 and cooling member 40, thereby preventing short-circuiting of power storage cell 23.

Cooling member 40 has a refrigerant flow passage 41 which allows a refrigerant for cooling first power storage stack 21 to flow therethrough. Cooling member 40 is deformable to follow the steps between power storage cells 21.

Specifically, cooling member 40 is formed by, for example, extruding a metal member. The extrusion forms a hollow refrigerant flow passage 41 inside the metal member. Aluminum having good thermal conductivity can be employed as the metal member. The metal member is has a plate shape that permits bending deformation. This allow cooling member 40 to be deformable to follow the steps between power storage cells 21. Note that cooling member 40 may be configured of flexible two thin plate members being bonded so as to form refrigerant flow passage 41. A metallic material having good thermal conductivity, such as aluminum, can be employed as the thin plate members. In this case, cooling member 40 is formed by, for example, roll bonding the thin plate members.

While refrigerant flow passage 41 extends linearly in FIG. 4 for conveniences, it should be noted that refrigerant flow passage 41 is not limited to be linear, and may be serpentine. An appropriate pattern can be set.

The refrigerant is allowed to flow through refrigerant flow passage 41, thereby allowing the absorption of heat from case 25 of each first power storage stack 21 via thermally conductive sheet 80 and cooling member 40. Case 25 has better thermal conductivity than frame 26 configured of a resin. For this reason, the temperature of first power storage stack 21 can be efficiently reduced by absorbing the heat from case 25.

First pressing member 51 presses heating member 30 against power storage module 20. First pressing member 51 is disposed below the heating member 30. First pressing member 51 includes a first press 511 and a second press 512. First press 511 and second press 512 are disposed so as to correspond to the regions in which heater wire 32 is disposed.

First press 511 is disposed on the first end portion 21a side of first power storage stack 21 in D direction. Second press 512 is disposed on the second end portion 21b side of first power storage stack 21 in D direction.

A sponge member, such as a urethane foam, can be employed as first press 511 and second press 512.

Second pressing member 52 presses cooling member 40 against power storage module 20. Second pressing member 52 is disposed below the heating member 30 and cooling member 40. A rubber member, such as a urethane rubber, can be employed as second pressing member 52.

Second pressing member 52 has an elastic modulus greater than the elastic modulus of first pressing member 51. For this reason, second pressing member 52 can have a restoring force greater than the restoring force of first pressing member 51. In other words, second pressing member 52 can have a pressing force greater than the pressing force of first pressing member 51. This allows cooling member 40 to be more strongly pressed against first power storage stack 21, resulting in an enhanced efficiency in cooling the first power storage stack 21.

First pressing member 51 and second pressing member 52 are disposed on base member 70 secured to bottom 16a of lower housing 16.

Base member 70 has a shape whose center portion is lower than the both sides in D direction. Base member 70 has a first mount portion 71, a second mount portion 72, and a third mount portion 73.

First mount portion 71 and second mount portion 72 are provided at the both sides of the center of base member 70. Third mount portion 73 is provided at the center portion of base member 70.

First mount portion 71 and second mount portion 72 are located closer to first power storage stack 21 than third mount portion 73 is. First press 511 is mounted on first mount portion 71. Second press 512 is disposed on second mount portion 72. Second pressing member 52 is disposed on third mount portion 73. Second pressing member 52 has a greater pressing force than the pressing forces of first press 511 and second press 512.

This allows sheet member 60 to be sandwiched between first power storage stack 21 and heating member 30 by the pressing forces of first press 511 and second press 512 disposed on the both sides of second pressing member 52. In addition, second pressing member 52 having a greater pressing force than the pressing forces of first press 511 and second press 512 allows cooling member 40 to be strongly pressed against first power storage stack 21. As a result, the airtightness of enclosed space S formed by sheet member 60 is enhanced, and the efficiency in cooling the first power storage stack 21 by cooling member 40 is also enhanced.

Furthermore, first mount portion 71 and second mount portion 72, having first press 511 and second press 512 mounted thereon, are located closer to first power storage stack 21 than third mount portion 73 having second pressing member 52 mounted thereon is, and thus first press 511 and second press 512 can be reduced in thickness. As a result, reduction in cost of first press 511 and second press 512 is achieved.

Moreover, a gap G1 is provided between first mount portion 71 and bottom 16a of lower housing 16 and a gap G2 is provided between second mount portion 72 and bottom 16a of lower housing 16. This allows gap G1 and gap G2 to function as thermal-insulation layers. For this reason, the heat, transferred from heating member 30 to first mount portion 71 and second mount portion 72, is less likely to be transferred to lower housing 16. As a result, the efficiency in heating the first power storage stack 21 is enhanced.

As described above, according to power storage device 10 of the present embodiment, heating member 30, deformable to follow the steps between power storage cells 23, is pressed by first pressing member 51 against first power storage stack 21, thereby suppressing variations in temperature between power storage cells 23 when heating the first power storage stack 21.

Moreover, cooling member 40, deformable to follow the steps between power storage cells 23, is pressed by second pressing member 52 against first power storage stack 21, thereby suppressing variations in temperature between power storage cells 23 when cooling the while first power storage stack 21.

Furthermore, the space in which cooling member 40 is disposed and the space in which heating member 30 is disposed can be partitioned by sheet member 60 covering the bottom of first power storage stack 21. This can inhibit the air, in the space in which heating member 30 is disposed, from advancing to enclosed space S in which cooling member 40 is disposed. As a result, condensation on the surface of cooling member 40 can be inhibited from occurring, thereby inhibiting first power storage stack 21 from short-circuiting due to the condensation.

As such, according to power storage device 10, the short circuit caused by condensation can be inhibited, and the temperatures of the power storage stacks can be regulated while suppressing the temperature variations.

While the above embodiment has been described with reference to base member 70 having first mount portion 71, second mount portion 72, and third mount portion 73, the present disclosure is not limited thereto. The bottom of housing 15 may have such portions. In this case, first mount portion 71 and second mount portion 72 of the bottom of housing 15 having are raised relative to third mount portion 73 of the bottom of housing 15.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power storage device, comprising:
a power storage stack which includes a plurality of power storage cells aligned in a given alignment direction;
a heating member that is deformable to follow steps between the plurality of power storage cells and heats the power storage stack;
a cooling member that is deformable to follow the steps between the plurality of power storage cells and has a refrigerant flow passage through which a refrigerant for cooling the power storage stack flows;
a first pressing member that presses the heating member against the power storage stack;
a second pressing member that presses the cooling member against the power storage stack; and
a sheet member covering a bottom of the power storage stack so that an enclosed space is formed between the sheet member and the power storage stack in a cross section of the power storage stack perpendicular to the alignment direction, wherein
the sheet member has a first surface and a second surface which are in opposing relation, the first surface facing the power storage stack, the second surface facing opposite the power storage stack,
the cooling member is disposed on a first surface side, within the enclosed space, and
the heating member is disposed on a second surface side, on an outer side of the enclosed space.

2. The power storage device according to claim 1, wherein the sheet member is sandwiched between the power storage stack and the heating member by a pressing force by the first pressing member.

3. The power storage device according to claim 2, wherein the plurality of power storage cells each include a case having a bottom surface and accommodating a power storage element, and a frame covering the bottom surface of the case,
the frame has a notch through which a portion of the bottom surface of the case facing the cooling member is exposed, and
the cooling member is pressed against the portion of the bottom surface exposed through the notch.

4. The power storage device according to claim 3, wherein a thermal conductive sheet is disposed between the cooling member and the portion of the bottom surface exposed through the notch, the thermal conductive sheet being electrically insulative.

5. The power storage device according to claim 1, wherein an elastic modulus of the second pressing member pressing the cooling member is greater than an elastic modulus of the first pressing member pressing the heating member.

6. The power storage device according to claim 1, wherein the power storage stack includes a first end portion and a second end portion in a direction perpendicular to the alignment direction,
the first pressing member includes a first press disposed on a first end portion side and a second press disposed on a second end portion side,
the second pressing member is disposed between the first press and the second press in the direction perpendicular to the alignment direction, the power storage device further comprising: a first mount portion on which the first press is mounted, a second mount portion on which the second press is mounted, and a third mount portion on which the second pressing member is mounted, wherein the first mount portion and the second mount portion are located closer to the power storage stack than the third mount portion is, and a pressing force by the second pressing member is greater than pressing forces by the first press and the second press.

7. The power storage device according to claim 6, further comprising a housing accommodating the power storage stack, wherein a gap is provided between the first mount portion and the housing, and a gap is provided between the second mount portion and the housing.

* * * * *